US007478503B2

(12) United States Patent
Milani et al.

(10) Patent No.: US 7,478,503 B2
(45) Date of Patent: Jan. 20, 2009

(54) FIRE STOP FRAME ASSEMBLY

(75) Inventors: Walter Milani, Woodbridge (CA); Larry Whitty, Woodbridge (CA); Brian Didone, Woodbridge (CA)

(73) Assignee: Columbia-MBF, Inc, Mississauga (CA)

( * ) Notice: Subject to any disclaimer, the term of this patent is extended or adjusted under 35 U.S.C. 154(b) by 207 days.

(21) Appl. No.: 11/260,094

(22) Filed: Oct. 28, 2005

(65) Prior Publication Data
US 2006/0102369 A1    May 18, 2006

(30) Foreign Application Priority Data
Nov. 1, 2004    (CA) .................................. 2486438

(51) Int. Cl.
E04C 2/00 (2006.01)
E04C 2/52 (2006.01)
E04H 9/00 (2006.01)
H02G 15/013 (2006.01)

(52) U.S. Cl. ............................. 52/232; 52/220.8; 52/1; 277/615

(58) Field of Classification Search ................... 52/232, 52/220.8, 317; 277/615
See application file for complete search history.

(56) References Cited

U.S. PATENT DOCUMENTS

| 4,221,092 A | * | 9/1980 | Johnson ........................ 52/232 |
| 4,419,535 A | * | 12/1983 | O'Hara ........................ 174/505 |
| 4,493,173 A | * | 1/1985 | Kohaut ........................ 52/220.8 |
| 4,901,488 A | * | 2/1990 | Murota et al. .................. 52/232 |
| 5,687,532 A |   | 11/1997 | Torrey |
| 6,536,169 B2 | * | 3/2003 | Dykhoff ...................... 52/220.8 |
| 7,018,699 B2 | * | 3/2006 | Dykhoff ....................... 428/76 |
| 2004/0016191 A1 | * | 1/2004 | Whitty ......................... 52/232 |

FOREIGN PATENT DOCUMENTS

CA    2394592    1/2004

* cited by examiner

Primary Examiner—Robert J Canfield
Assistant Examiner—Brent W Herring

(57) ABSTRACT

A fire stop assembly for bordering a conduit access through a building separation, includes a rigid body portion with an access opening with the access opening being adjustably closed to define a conduit fitting opening within the access opening. The remainder of the access opening is adjustably closed by a fire block arrangement comprising a lining of intumescent material on opposite sides of a conduit fitting opening and a series of non intumescent flame retardant members cooperating with the lining of intumescent material to close the remainder of said access opening. Preferably the non-intumescent flame retardant members are a series of plastic sleeves filled with mineral wool or other suitable insulation material. The sleeves and fill material are removable to adjust the opening size. The sleeves serve to protect the insulation material during the normal life of the fire stop assembly until a fire condition occurs.

17 Claims, 6 Drawing Sheets

FIRE STOP FRAME ASSEMBLY

FIELD OF THE INVENTION

The present invention relates to a fire stop frame assembly that allows conduits to pass through the frame assembly between floors or walls of a building and form a fire stop and is related to the subject matter of commonly owned U.S. Pat. No. 6,848,227.

BACKGROUND OF THE INVENTION

Conduit openings are required in a building separation to allow different types of conduits to pass from one room to another within a building. By way of example, the floor of a building will include an opening through which cables, telephone wires and pipes etc. are fitted into the building. These conduit openings must be provided with means to seal them off in the event of a fire and smoke situation. Otherwise the openings form open flow channels for the fire and smoke to pass from level to level through a building.

It is known in the industry to provide fire and smoke blocking means at a conduit access through a building separation. However, the known methods of providing such blockage do not adapt themselves particularly well to adding further conduit through the access.

For example, it is known to fit cable and telephone wire through a blocking member at a conduit access. Specific openings are provided in the blocking member to accommodate each cable or wire passing through the opening. These openings are dimensioned at substantially the same diameter as the cable and wire passing through the opening. Accordingly, the only way to later fit further cable and wire through the access is by removing the blocking member to provide further openings for the cable and wire to be added. This is a time consuming job and results in a potentially hazardous situation during the time that the blocking member needs to be removed from the access to add the new openings.

SUMMARY OF THE PRESENT INVENTION

A fire stop assembly for bordering a conduit access through a building separation according to the present invention includes a rigid body portion with an access opening through said rigid body portion. The access opening is adjustably closed by a fire block arrangement to define a conduit fitting opening within the access opening. The fire block arrangement comprises a lining of intumsecent material adjacent the conduit fitting opening and a series of non intumsecent flame retardant members cooperating with said lining of intumsecent material to close the access opening about the conduit fitting opening.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION IN WHICH

Figure 1:
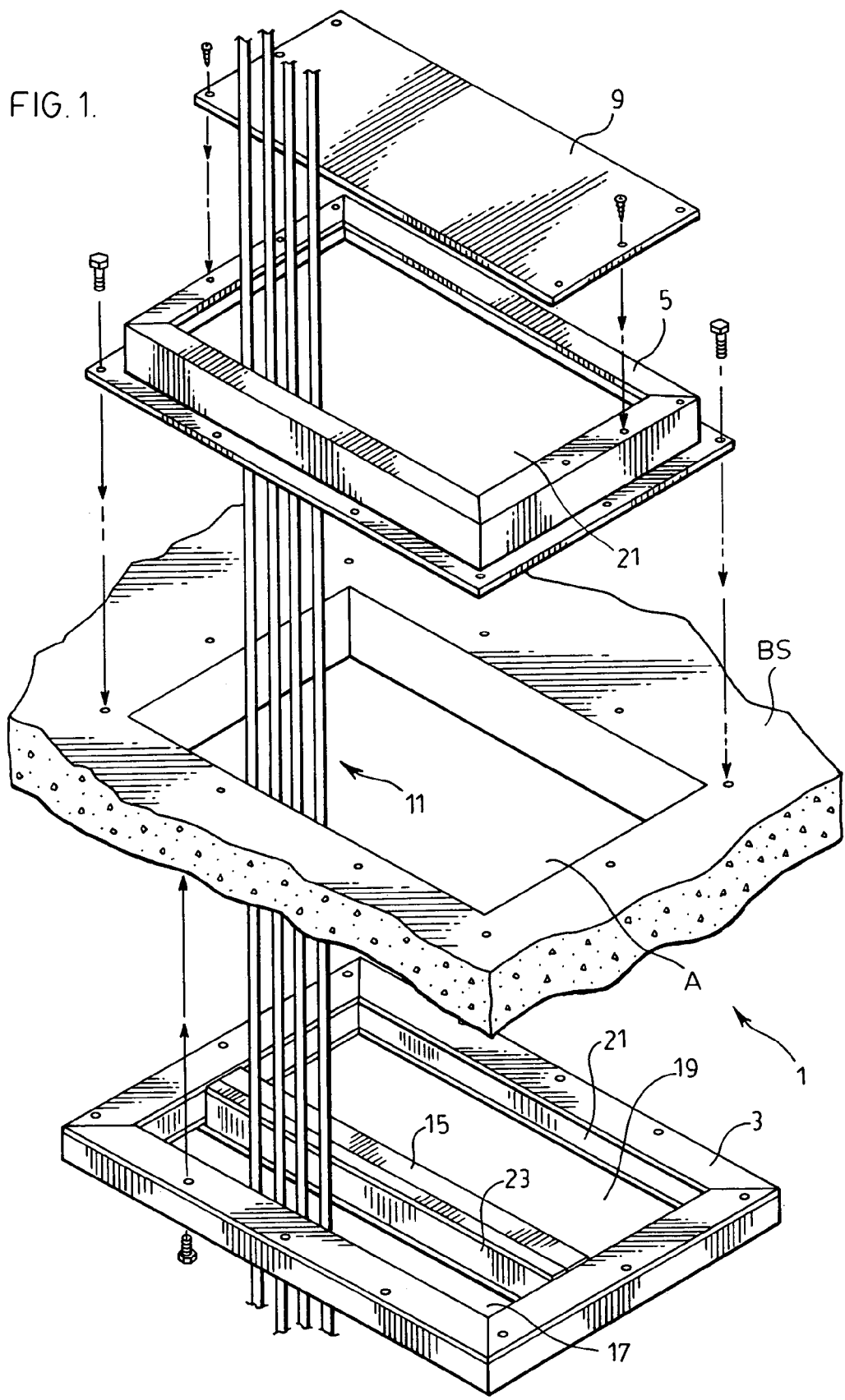
FIG. 1 is an exploded perspective view of a conduit access framing system according to a preferred embodiment of the present invention.

FIG. 1 shows a framing assembly 1 for framing an access opening A through a building separation BS. In this particular case, the building separation comprises a floor of a building through which a bundle of wires generally indicated at 11 are passed into the building. These wires will be cable lines and telephone wires etc. In other situations the access opening can be used for fitting other types of conduit such as ducts and pipes through the building separations.

Framing assembly 1 comprises a pair of actual frame members 3 and 5 which are used to border access A from below and above the access opening. The upper frame member 5 defines a singular rectangular opening 21 through the frame member.

The lower frame member 3 includes a frame spanning member 15 which divides the open area through frame member 3 into a first opening 17 and a second opening 19. As shown in FIG. 1 the bundle of wires 11 pass upwardly through the first opening 17 in the lower frame member 3.

Figure 2:
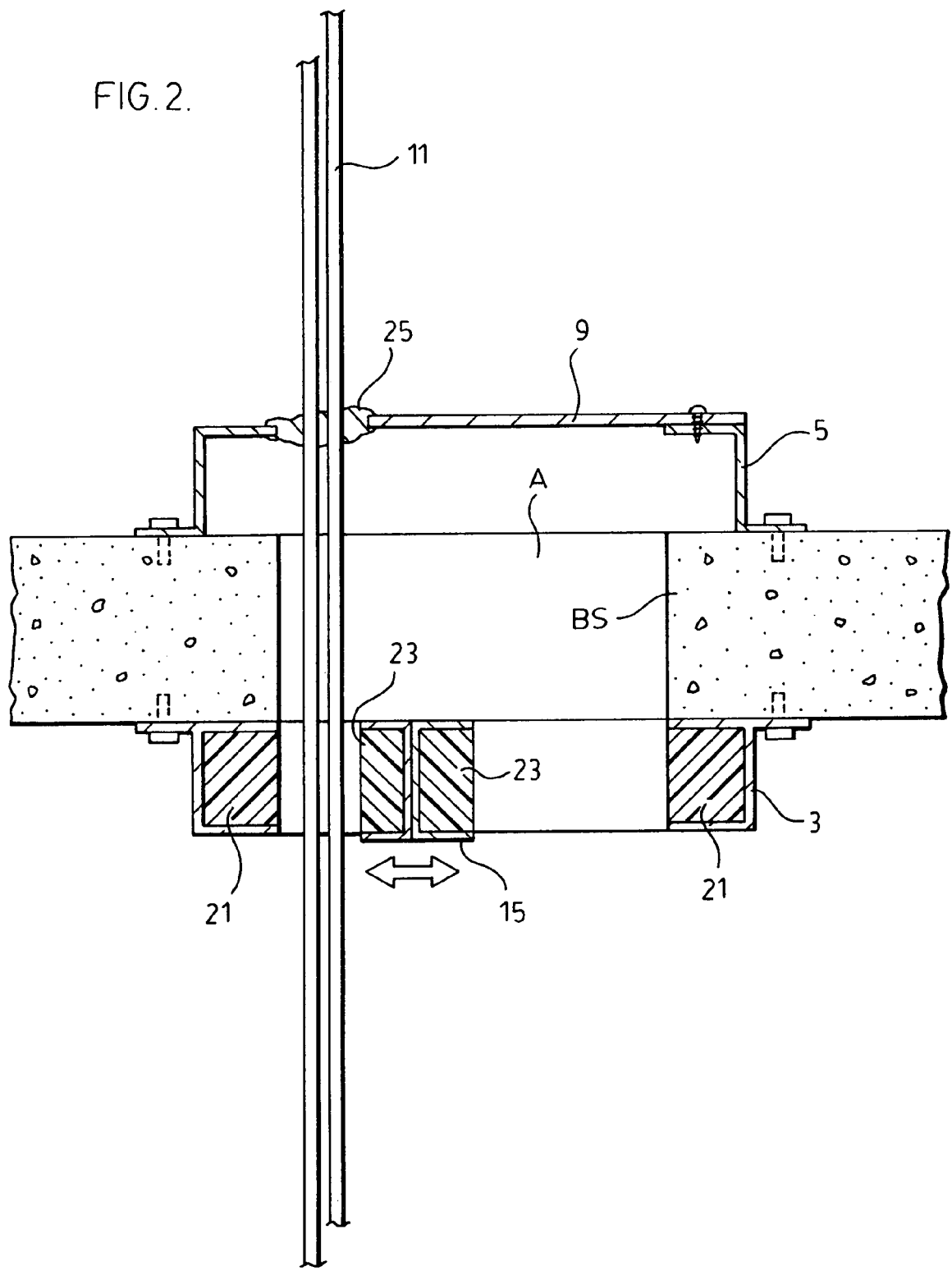
FIG. 2 is a sectional view through the framing system of FIG. 1 in an assembled condition.

The two frame members 3 and 5 are mechanically secured to the under surface and the top surface respectively of the building separation as shown for example in FIG. 2 of the drawings. In addition, a covering plate 9 secures atop the upper frame member 5 covering most of the opening 21 through the upper frame member. The only part of opening 21 which is not covered is the area where the wires 11 pass through the upper frame member.

Each of the frame members 3 and 5 has a rigid construction with both frame members preferably being made of a heavy gauge metal. Cover plate 9 also preferably has a metallic construction thereby ensuring the integrity of the assembled system.

FIG. 2 of the drawings shows a number of further features of the system of FIG. 1. More particularly, FIG. 2 shows that the lower frame member 3 is provided with a lining 21 of intumescent material. This lining is provided on the interior surfaces of at least the two longer sides of frame member 3 and is preferably provided on the interior surfaces of all four sides of the lower frame member.

Frame spanning member 15 which again preferably has a metallic construction is also provided with opposite side linings 23 of intumescent material. Accordingly, each of the openings 17 and 19 is exposed to the intumescent material from opposite sides of each of the openings.

The actual intumescent material used to provide the two linings 21 and 23 is preferably a plastic based extruded material which is bonded to the frame member. By way of example only, the intumescent material may be extruded graphite in a polyvinyl chloride carrier. Such material when subjected to heat indicative of a fire situation intumesces or expands as shown in FIG. 3 to many times the size of its non-intumesced condition as shown in FIG. 2.

Another feature shown in FIG. 2 is that the individual wires 11 are packed together with one another by putty material 25 which may also be intumescent material. This material helps to keep the wires in their bundled configuration and also acts as a fire and smoke seal where the bundles pass through the non-covered opening in the upper frame 5.

Figure 3:
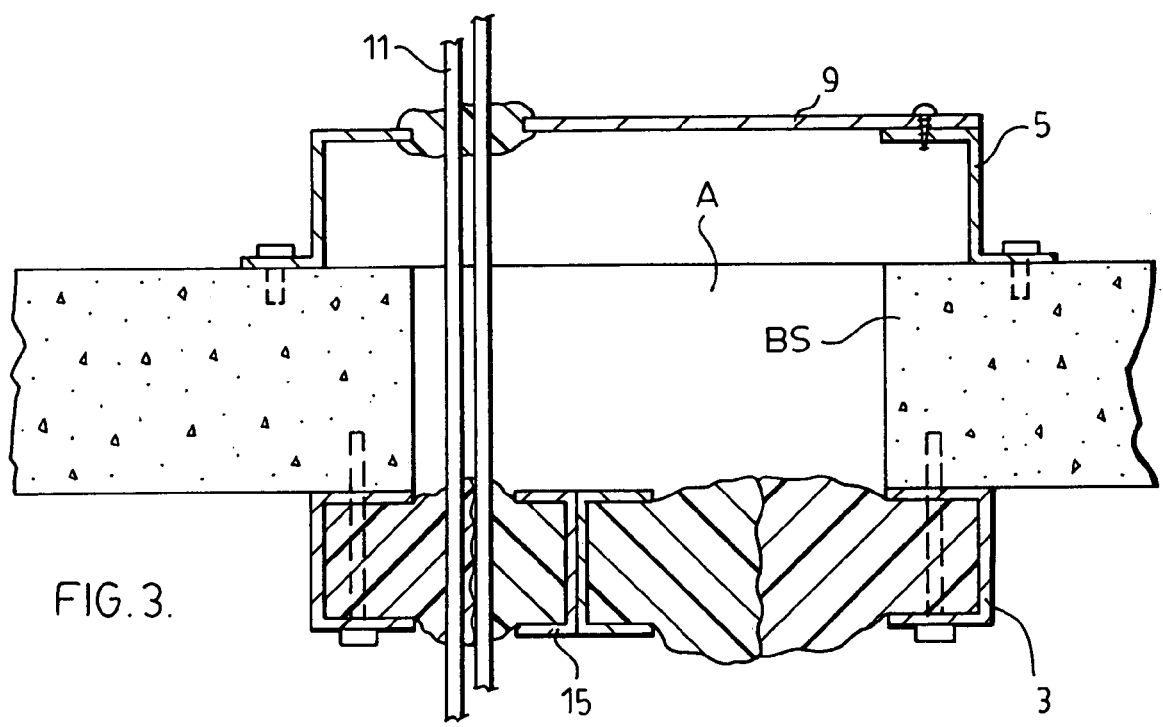
FIG. 3 is a view similar to FIG. 2 following an intumescing of the intumescent material within the system.

As earlier noted FIG. 3 of the drawings shows the frame assembly in an intumesced condition. In this condition, the intumescent linings of the lower frame member 3 and the frame spanning member 15 have expanded sufficiently to completely close off both of the openings 17 and 19 through the lower frame member. In addition, the putty 25 around the wires 11 completely seals off the opening not covered by plate 9 through the top frame 5.

The rest of the open through the upper frame member to the side of the wire bundle may also be closed off by silicone packing or the like. Here it should be noted that the preferred metallic construction of the different frame members and components provides a very rapid heat transfer for a fast reaction of the intumescent material for sealing off the entire assembly when subject to fire indicating heat conditions. Accordingly, fire and smoke is prevented from passing through the access opening upon activation of the intumescent material.

One of the key features of the present invention resides in the feature that no particular pattern of holes needs to be provided in either the lower or upper frame member to receive the cables and wires 11 or any other type of conduit. For example, as will be seen in FIG. 1 opening 17 through the lower frame member and the opening left through the upper frame member after placing the top cover on the upper frame member are both substantially oversized relative to the number of wires passing through the two frame members. Accordingly, it is only a matter of simply shoving additional cables and wires upwardly through the frame assembly without having to reconfigure it whatsoever. The only thing that needs to be added to receive the additional wires and cables is more putty around the newly added wires and cables. However, this does not require any disassembly whatsoever of the system.

The use of the putty between the wires not only holds the wires in a pre-set desired position but also ensures that any possible gaps between the wires are sealed off by the putty.

Figure 4:
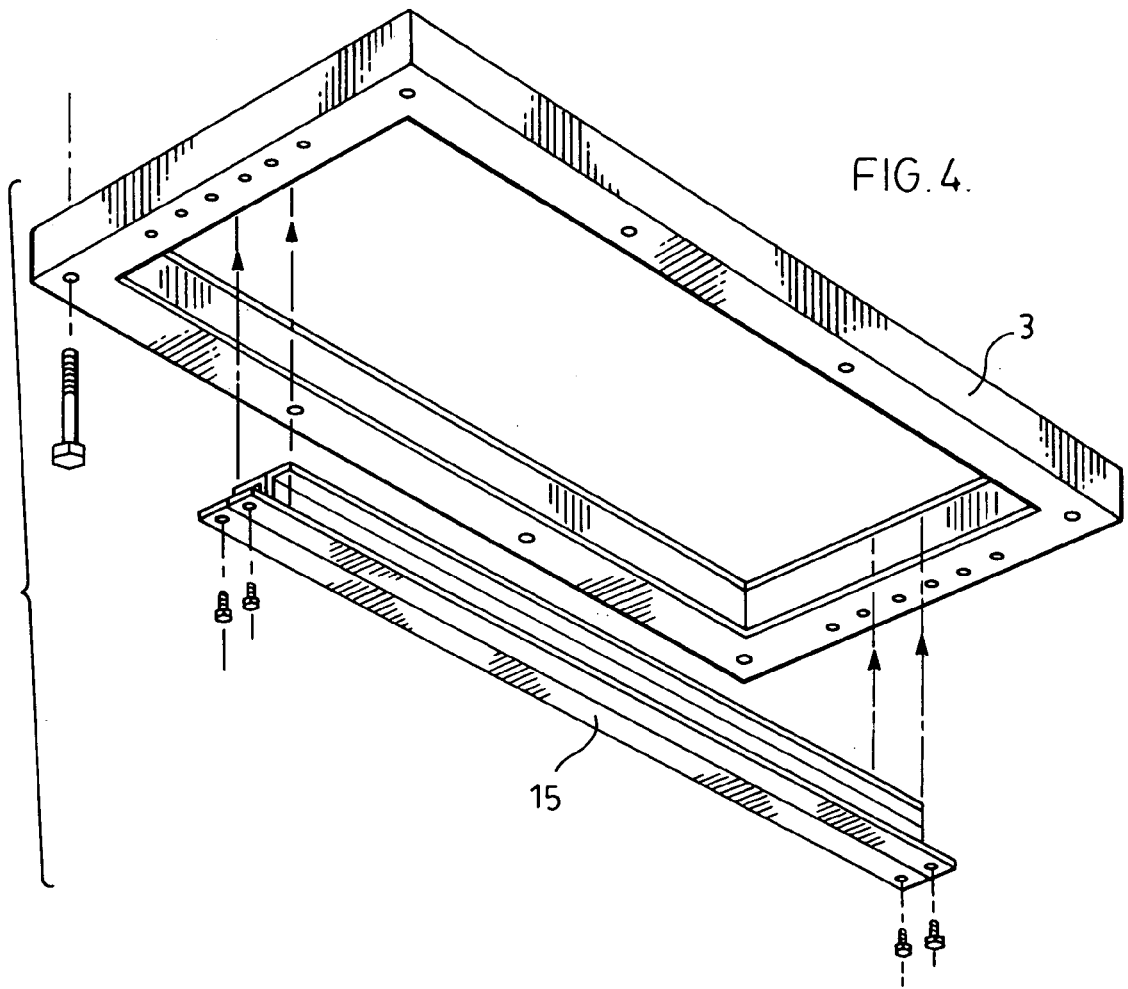
FIG. 4 is an exploded perspective view of the bottom framing element of the system of FIG. 1.

Another feature of the present invention is that both the frame spanning member 15 and the top cover 9 are moveable in position relative to the lower and upper frame members respectively. This becomes important in the event that opening 17 through the lower frame member 3 and the aligned opening around cover 9 on the top frame member become overly crowded and not capable of accepting any further conduit. This situation is dealt with by simply repositioning spanning member 15 on the lower frame member 3 using anyone of the different sets of mounting holes in the lower frame member as shown in FIG. 4 of the drawings. By doing this the size of opening 17 can be increased while decreasing the size of opening 19. In addition, the upper frame member 5 is also provided with different sets of mounting holes to allow a repositioning of cover 9 on the upper frame member as shown in FIG. 1 of the drawings. Once again, the reconfiguration of the system to accept more wires is done without having to remove either frame member from its mounted position around the access opening A. Therefore, if a fire situation were to occur while setting the system up to receive more wires and cables the lower frame member with its intumescent lining 21 would still be capable of immediately reacting to the situation by intumescing to close off all of the open area through the lower frame member.

Figure 5:
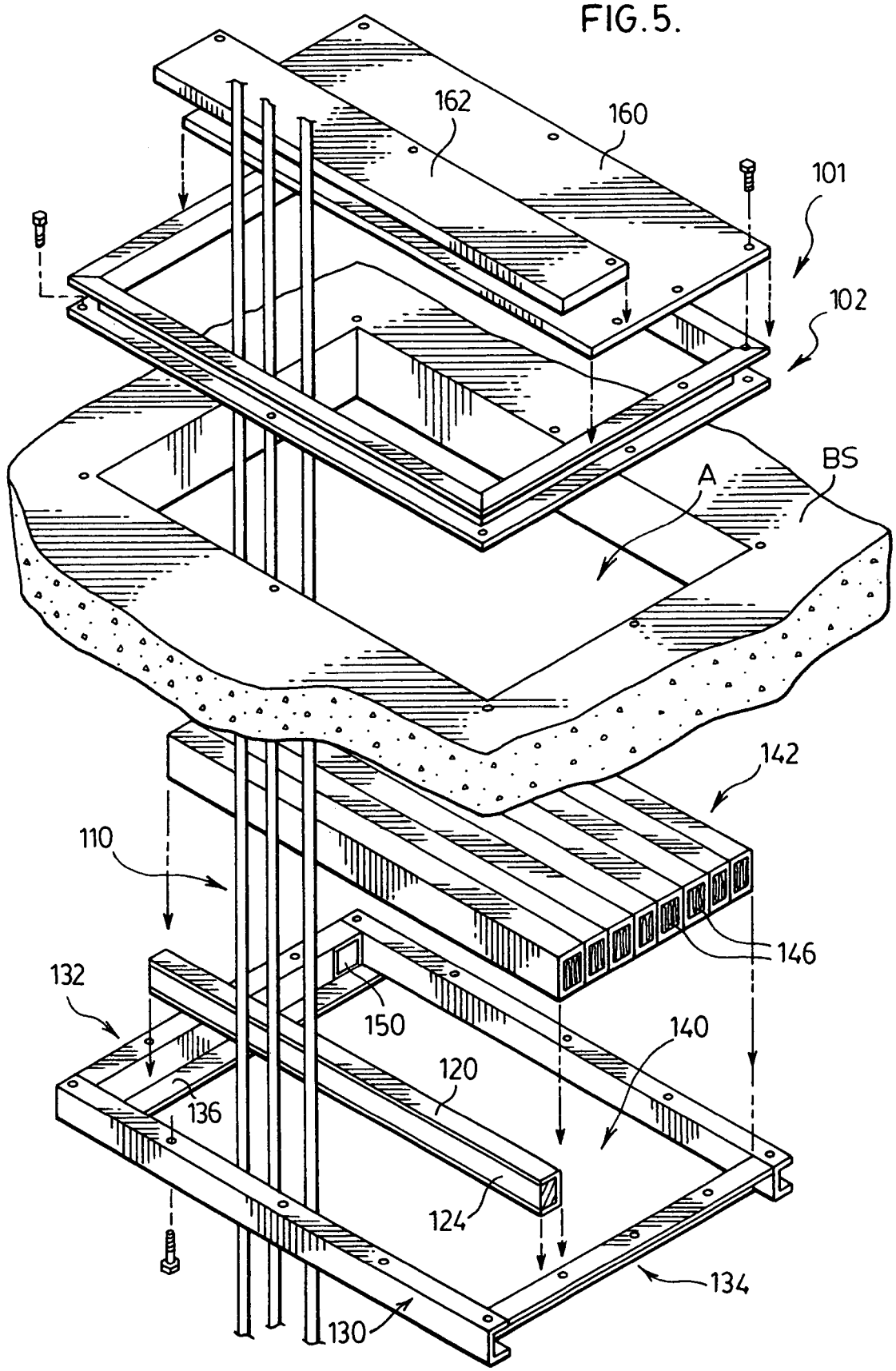
FIG. 5 is an exploded perspective view of a further embodiment of the invention.
Figure 6:
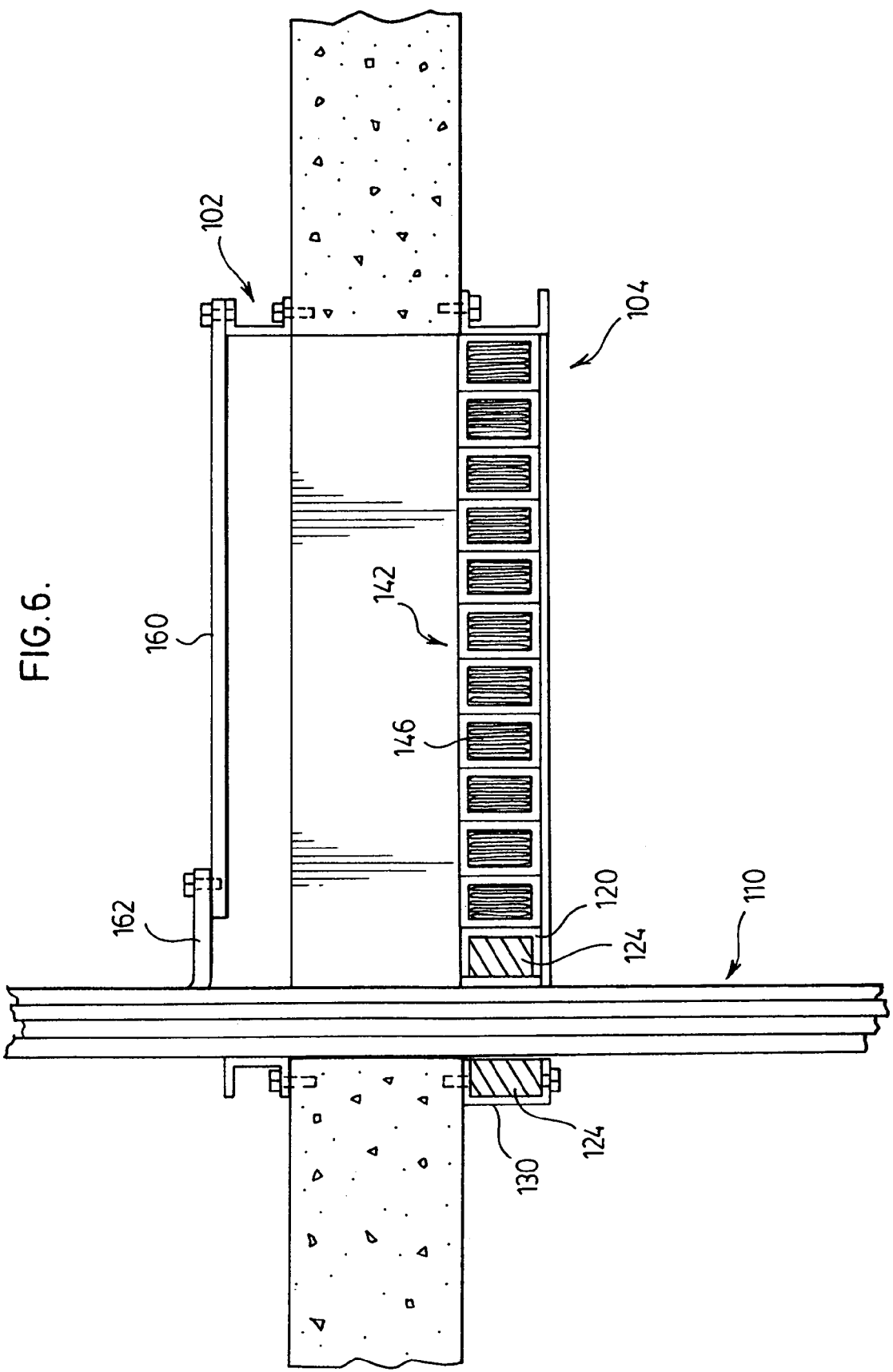
FIG. 6 is a longitudinal sectional view through the embodiment of FIG. 5.
Figure 7:
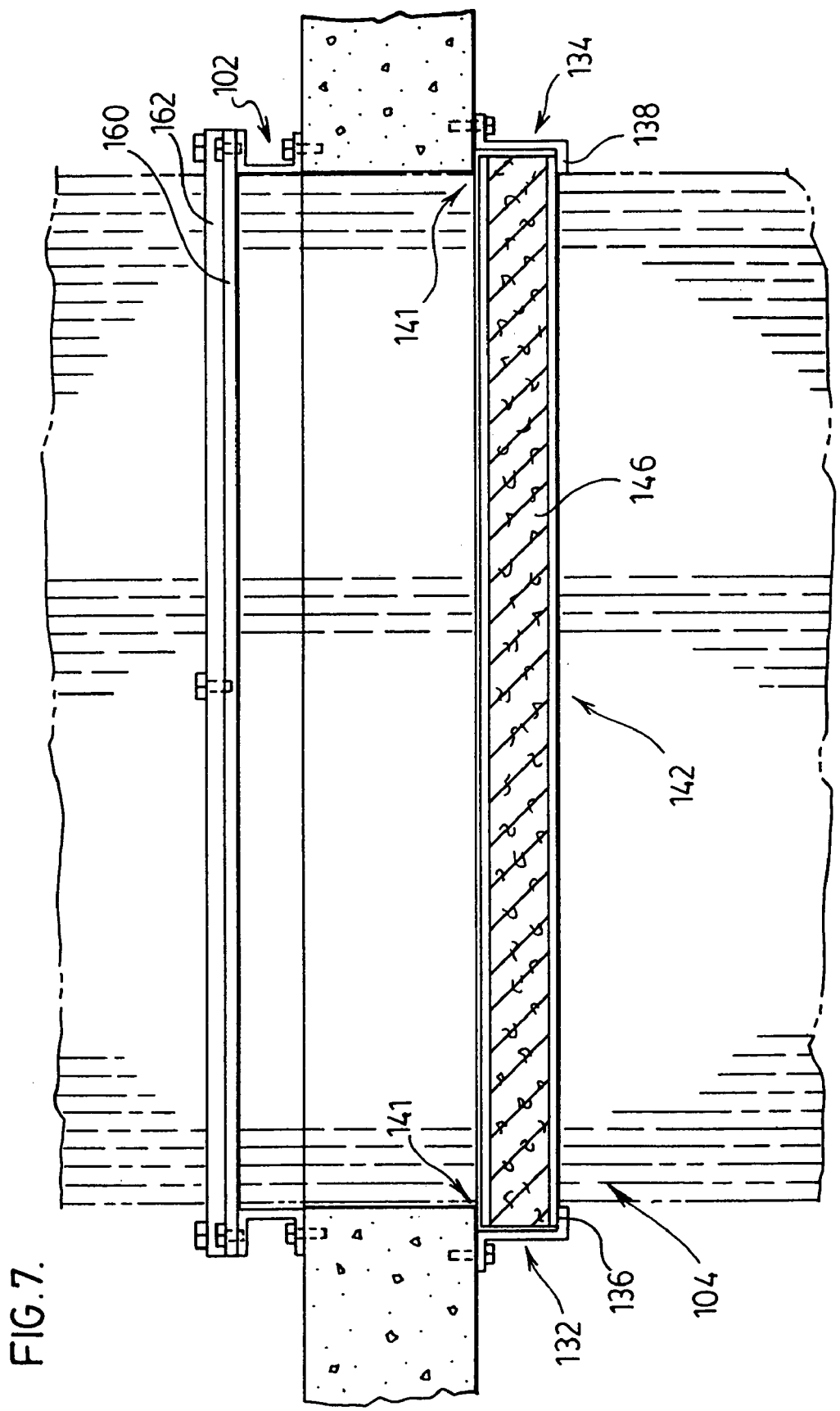
FIG. 7 is a longitudinal sectional view of the embodiment of FIG. 5.

The alternate embodiment of FIGS. 5 through 7 share many of the features of the previous structure but use a different variable filler tube arrangement to block off unused space within the access opening. The frame assembly 101 has an upper perimeter frame 102 and a lower perimeter frame 104 about the access opening A. A series of cables conduits pipes etc. 110 are shown passing through the access opening and through the perimeter frames along one edge portion of the frames. These cables and conduits are located in conduit fitting opening within the access opening.

The inwardly opening 'C' shaped channel 130 of the lower perimeter frame is adjacent the series of cables and this channel includes intumscent fill material 124 (see FIG. 6). A movable channel 120 is positioned on the opposite side of the series of conduits and includes intumsecent fill material 124 facing the conduits. Channel 120 is slidable along the support flanges 136 and 138 of the 'Z' shaped channels 132 and 134 of the lower perimeter frame 104. In this way additional space for cables is available as may be necessary for example for future or unexpected additional capacity.

The opening 140 to one side of channel 120 is blocked with filler tubes 142. These filler tubes are preferably generally rectangular and of an extruded plastic material which acts as a sleeve for retaining the flame stop material 146. This flame stop material is preferably a compressed mineral wool insulation material. If additional space is required for the series of conduits one or more of the filler tubes may be removed. The filler tubes often are of a length to overlap with the concrete about the perimeter of the access opening as shown at 141 in FIG. 7. These filler tubes are also slidable along 'Z' shaped channels 132 and 134. A trap door 150 is provided in at least one of the channels 132 and 134 to allow longitudinal removal of a filler tube as may be required from time to time.

The filler tubes 142 are preferably 3 inches by 1.5 inches with the 3 inch dimension aligned vertically. This allows expansion for additionally cables in 1.5 inch increments but more importantly provides approximately 3 inches of insulation that helps protect the upper cover from flame conditions and excessive temperatures in the event of a fire below.

The preferred mineral wool 146 is compressed in a side to side manner whereby expansion would occur towards each of the channels 132 and 134. Different amounts of compression can be used however the range of 20 to 70% works well with 4 lbs/ft$^3$. the preferred compression is about 50%. When exposed to combustion conditions from below the frame assembly the PVC tubes start to combust on the lower surface and subsequently melt or start on fail on the sides of the tubes. The mineral wool serves to insulate the upper surface from the flame conditions. Partial failure of the tubes results in expansion of the mineral wool that previously was retained in a compressed state by the tube. This expansion assists in forming a fire barrier and fills any gaps where the sides of the tubes have failed or been consumed. This expansion of the compressed mineral wool or other suitable material, is also believed to assist in maintaining the barrier in place under fire conditions. The mineral wool barrier cooperates with the intumscent material provided in channels 120 and 130 to fully block the access opening A. The expanding intumscent is forced between the series of conduits between the opposed channels and also expands upwardly and inwardly as shown in the earlier drawings.

Additional strips or layers of intumescent material can be provided. For example, a strip on intumescent material can be provided between the last fill tube adjacent the channel 131 of the lower perimeter frame. The perimeter frame is preferably metal and will become hot quickly under fire conditions. This strip of intumscent material provides some protection for the last filler tube.

The fire stop frame assembly as described provides an initial flame block layer at the lower frame. This flame block layer helps protect the upper cover plate 160 and the foam intumscent layer 162 from the flame and high temperature conditions. In this way the upper perimeter frame and its components including the cover plate remain in place and prevent penetration through the fire stop assembly. The upper cover plate can be made of metal, a phenolic material or other suitable material. This fire stop assembly can be used to meet CAN4-S115-M85, Standard Method of Fire Tests of Firestop (Canadian standard) and/or UL 1479, Fire Tests of Through-Penetration Firestop (American standard). These tests expose the lower frame to temperatures in excess of 1000° C. for over 1 hour.

The plastic fill tubes form a sleeve that protects the compressed non-flammable insulation material until it is needed. The plastic fill tubes are easily cleaned and can be produced in different colors if appropriate. The desired flame barrier characteristics of the fill material are not subject to contamination or deterioration caused by the particular environment or unexpected cleaning activities. In addition, the fill tubes provide a cost effective alternative to intumscent fill arrangements. Although plastic filler tubes have been described and form a cost effective arrangement other materials could be used including metal tubes. Basically a non-intumscent fire retardant insulation forms an effective incrementally variable fire-blocking layer. The tube retention of this material is preferred but alternate arrangements could be used. Some additional structural rigidity and protection of the material is desired.

Depending upon the particular application the top frame could be omitted and the top plate secured to the concrete. In addition, the top frame if present may be of a non-metal material. Different top plate arrangements can be used to cover the access opening and provide a barrier thereabout. The frame does act like a toe guard or warning about the access opening.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A fire stop assembly for bordering a conduit access through a building separation, said fire stop assembly having a rigid body portion with an access opening through said rigid body portion, said access opening being adjustably closed by a fire block arrangement to define a conduit fitting opening forming part of said access opening; said fire block arrangement comprising a lining of intumescent material adjacent said conduit fitting opening and a series of non-intumescent flame retardant members cooperating with said lining of intumescent material to close said access opening about said conduit fitting opening wherein said series of non-intumescent flame retardant members are a series of elongate members having a receiving cavity extending in the length thereof and filled with a fire retardant insulation material and wherein said lining includes a movable channel slidable with respect to the rigid body portion and removeably affixed thereto.

2. A fire stop assembly as claimed in claim 1 wherein said rigid body portion is made of a metallic material to enhance transfer of heat energy from said rigid body portion to said lining of intumescent material.

3. A fire stop assembly as claimed in claim 1 wherein said fire retardant insulation material is compressed and retained compressed by the respective receiving cavity of the elongate member.

4. A fire stop assembly as claimed in claim 3 wherein said fire retardant insulation material is mineral wool.

5. A fire stop assembly as claimed in claim 1 wherein said elongate members are plastic tubes.

6. A fire stop assembly as claimed in claim 5 wherein said plastic tubes are made of a PVC material.

7. A fire stop assembly as claimed in claim 5 wherein said plastic tubes are made of a PVC material.

8. A fire stop assembly as claimed in claim 5 wherein said plastic tubes are of a generally rectangular cross section.

9. A fire stop assembly as claimed in claim 8 wherein said generally rectangular plastic tubes have a short side and a long side in cross section and said long side is disposed parallel to a depth of said rigid body portion.

10. A fire slop assembly as claimed in claim 8 wherein said plastic tubes are slidably supported in said rigid body portion.

11. A fire stop assembly as claimed in claim 10 herein said rigid body portion has an access port through a frame member thereof arranged to allow slide removal of any of said plastic tubes to increase the side of said conduit fitting opening to accommodate additional conduits.

12. A fire stop assembly as claimed in claim 11 wherein said access port through said frame member includes a movable member for selective opening and closing of said access port.

13. A fire stop assembly as claimed in claim 11 wherein said plastic tubes are of a PVC material and said flame retardant insulation material is mineral wool or other suitable glass fiber insulation material.

14. A fire stop assembly as claimed in claim 1 wherein said lining of intumescent material is on either side of said conduit fitting opening.

15. A fire stop assembly as claimed in claim 14 wherein said lining of intumescent material is retained in a movable channel spanning the rigid body portion.

16. A fire stop assembly as claimed in claim 1 wherein said rigid body portion includes an access port in a side thereof through which non-intumescent flame retardant members can be longitudinally withdrawn.

17. A fire stop assembly as claimed in claim 16 wherein said access port in said side of said rigid body portion includes a cover for selective opening and closing of said access port.

* * * * *